US007142087B2

(12) United States Patent
Greywall

(10) Patent No.: US 7,142,087 B2
(45) Date of Patent: Nov. 28, 2006

(54) MICROMECHANICAL LATCHING SWITCH

(75) Inventor: Dennis S. Greywall, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 358 days.

(21) Appl. No.: 10/766,451

(22) Filed: Jan. 27, 2004

(65) Prior Publication Data

US 2005/0183609 A1 Aug. 25, 2005

(51) Int. Cl.
*H01H 37/52* (2006.01)
*H02N 2/00* (2006.01)
*F24C 15/24* (2006.01)

(52) U.S. Cl. .......................... 337/36; 337/70; 102/264; 102/254

(58) Field of Classification Search .................. 337/36, 337/70, 298; 102/251, 222, 235, 247, 102, 102/254, 256
See application file for complete search history.

(56) References Cited

U.S. PATENT DOCUMENTS 5,052,300 A 10/1991 Josse .......................... 102/201
6,074,890 A 6/2000 Yao et al. ..................... 438/52
6,130,464 A 10/2000 Carr ........................... 257/417
6,167,809 B1 1/2001 Robinson et al. ........... 102/235
6,321,654 B1 11/2001 Robinson .................... 102/251
6,568,329 B1 * 5/2003 Robinson .................... 102/231
6,882,264 B1 * 4/2005 Cunningham ............... 337/139
6,964,231 B1 * 11/2005 Robinson et al. ........... 102/235

FOREIGN PATENT DOCUMENTS

FR 2760266 A 2/1997

* cited by examiner

*Primary Examiner*—Anatoly Vortman

(57) ABSTRACT

A micro-electrical-mechanical-switch (MEMS) device comprises a semiconductor wafer, a first semiconductor layer formed on the semiconductor wafer, and a second semiconductor layer formed on the first layer. A first latching movable shuttle is formed in the second layer and has the first layer removed under the first movable shuttle, the first movable shuttle being moved in a first direction relative to the wafer in response to a predetermined acceleration of the MEMS device in a direction opposite to the first direction thereby changing an operating condition of the MEMS device from a first switch state to an intermediate switch state. A second latching moveable shuttle is formed within the first shuttle, the second shuttle being moved in a second direction relative to the first shuttle in response to a thermally activated force so as to change the operating state of the MEMS device from the intermediate switch state to a second switch state. In the second switch state an opening in the second latching moveable shuttle aligns with an opening in the wafer to enable an optical signal to pass through the aligned openings. In a second embodiment, a MEMS device comprises only one movable shuttle switch formed in the second layer, the shuttle switch being operated in response to a predetermined acceleration of the MEMS device.

20 Claims, 7 Drawing Sheets

6mm

4mm

LATCH ELEMENT 104

ABSORBING STOP 111

SUPPORT SPRING ELEMENT 102

SHUTTLE B 105

MICROMECHANICAL LATCHING SWITCH

TECHNICAL FIELD OF THE INVENTION

This invention relates generally to an arming device used in fusing of projected munitions and, more particularly, to a micromechanical latching switch for use in an arming device.

BACKGROUND OF THE INVENTION

Artillery shells are equipped with a safety and arming device (S&A) that permits detonation of the carried explosive only after the projectile has experienced a valid progression of physical launch conditions, including the huge initial acceleration (10,000–80,000 g). The arming device functions with sequential interlocks to remove a barrier in the fire train and/or to move out-of-line fire-train components into alignment. Once armed, the device can be fused with, e.g., an electrical discharge or a laser pulse. For safety, the S&A is required to be able to withstand a munitions mishandling drop from 40 ft. without damage or arming.

A typical arming device is centimeter sized and piece part assembled using screws, pins, springs, and tight-tolerance machined components. Shelf life is affected by the use of dissimilar materials and by the need for lubrication. Recent arming device modernizing efforts have been motivated by lower cost, weight, and volume. One such arrangement described by C. H. Robinson in U.S. Pat. No. 6,167,809 entitled "Ultra-Miniature, Monolithic, Mechanical Safety-and-Arming Device for Projected Munitions" is directed towards a monolithic metal (nickel) device fabricated using the LIGA micro machining process.

Notwithstanding the recent improvements made in these arming devices, there is a continuing need for further miniaturization and improved safety of arming devices.

SUMMARY OF THE INVENTION

In accordance with the present invention, a micro-electrical-mechanical-switch (MEMS) arming device is formed from a micromachined monolithic semiconductor device having multiple-interlocks that is partially armed by the launch acceleration and fully armed by on-demand thermal activation.

More particularly, my MEMS monolithic semiconductor device comprises a semiconductor wafer, a first dielectric layer formed on the semiconductor wafer, and a second semiconductor layer formed on the first layer;

a first latching movable shuttle formed in the second layer and having the first layer removed under the first shuttle, the first shuttle being moved in a first direction relative to the wafer in response to a predetermined acceleration of the MEMS device in a direction opposite to the first direction, so as to change an operating condition of the MEMS device from a first switch state to an intermediate switch state;

a second latching moveable shuttle formed within the first shuttle, the second shuttle being moved in a second direction relative to the first shuttle in response to a thermally activated force so as to change the operating state of the MEMS device from the intermediate switch state to a second switch state; and wherein in the second switch state an opening in the second shuttle aligns with an opening in the wafer to enable an optical signal to pass through the aligned openings.

In a second embodiment, my MEMS, monolithic semiconductor device comprises a semiconductor wafer, a first electrically insulating layer formed on the semiconductor wafer, and a second semiconductor layer formed on the first layer;

a latching movable shuttle switch formed in the second layer and having the first layer removed under the shuttle switch, the shuttle switch being moved in a first direction relative to the wafer in response to a predetermined acceleration of the MEMS device in a direction opposite to the first direction, thereby changing an operating state of the shuttle switch.

According to another feature, my MEMS device includes means for preventing the movement of the second shuttle prior to the latching of the first shuttle. Another feature includes an electrical switch for providing an electrical switch connection when the MEMS device is in the intermediate switch state. Yet another feature includes an absorbing stop formed in the second layer for limiting the movement of the first shuttle in the first direction. According to another feature the MEMS device is formed by (A) first patterning and etching the first shuttle in the second layer and stopping on the first dielectric layer, (B) patterning and etching a predetermined pattern in the semiconductor wafer from the bottom surface and stopping on the first dielectric layer, (C) etching away the exposed regions of the first dielectric layer, and (D) continuing this etch to allow undercutting sufficient to free the shuttle from the substrate.

BRIEF DESCRIPTION OF THE DRAWINGS

The present invention will be more fully appreciated by consideration of the following Detailed Description, which should be read in light of the accompanying drawings in which.

In the following description, identical element designations in different figures represent identical elements. Additionally in the element designations, the first digit refers to the figure in which that element is first located (e.g., 101 is first located in FIG. 1).

DETAILED DESCRIPTION

Figure 1A:
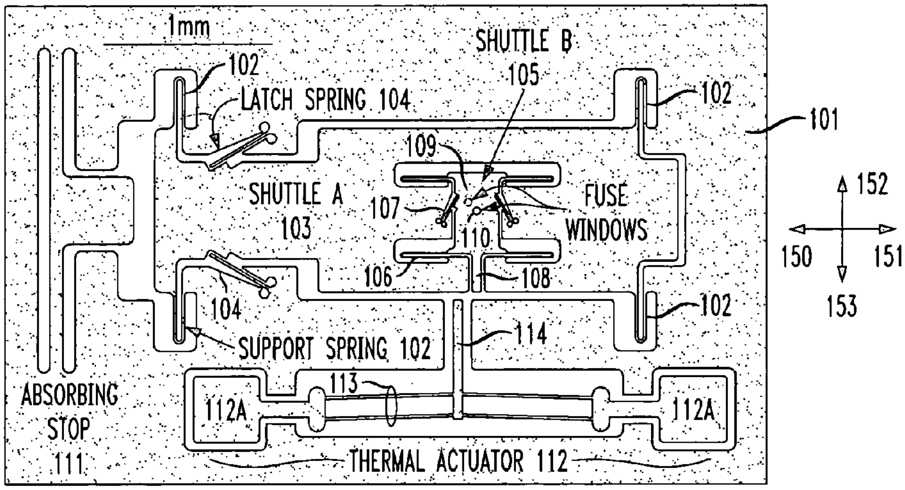
FIGS. 1A–1C illustrate a top view of a first embodiment of my MEMS device as an arming device, respectively, when in the safe position, the partially armed position and the fully armed position.
Figure 1B:
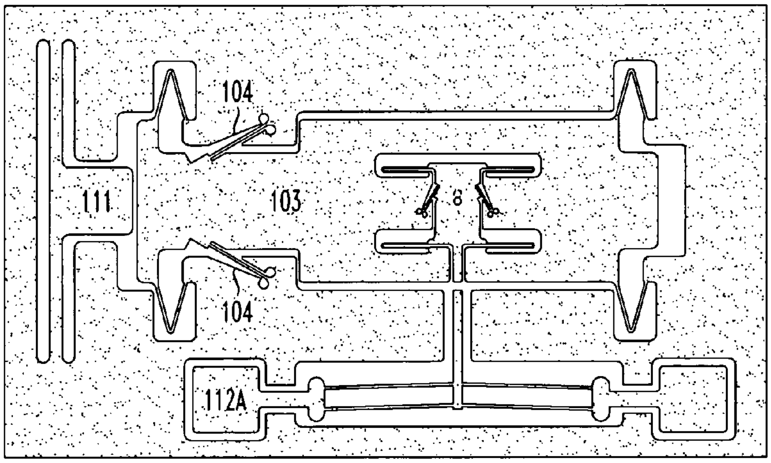
Figure 1C:
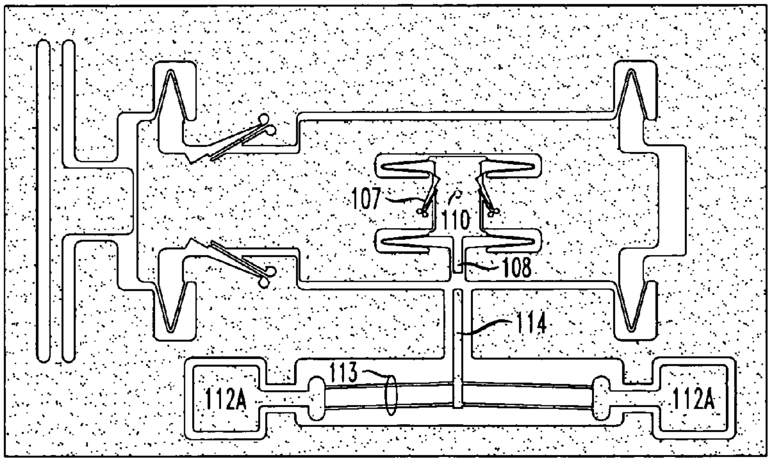

With reference to FIGS. 1A–1C there is shown, in accordance with the present invention, an illustrative embodiment of my micro-electrical-mechanical-switch (MEMS) device (or MEMS shutter) 100 used as an arming device. It should be noted that while my MEMS device is described for use as an arming device, it more generally can be used in other applications requiring an inertial latching switch, e.g., an automotive accelerometer. The MEMS arming device 100 is implemented as part of a fusing arrangement of a munition (also referred herein as an ordnance), the fusing arrangement being used to detonate that munition once it has been fired. In FIG. 1A, the MEMS arming device 100 is shown in a rest position (first switch state) prior to the munition being fired. In FIG. 1B the MEMS arming device 100 is shown in a partially armed position (intermediate switch state) after the munition has been fired. In FIG. 1C, the MEMS arming device 100 is shown in a fully armed position (second switch state) after the munition has been fired and then thermally activated.

Figure 12A:
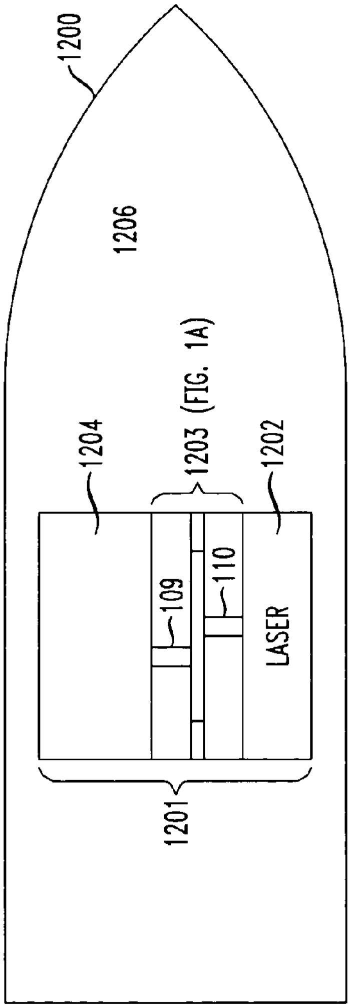
FIG. 12 shows an illustrative munition including my MEMS arming device.
Figure 12B:
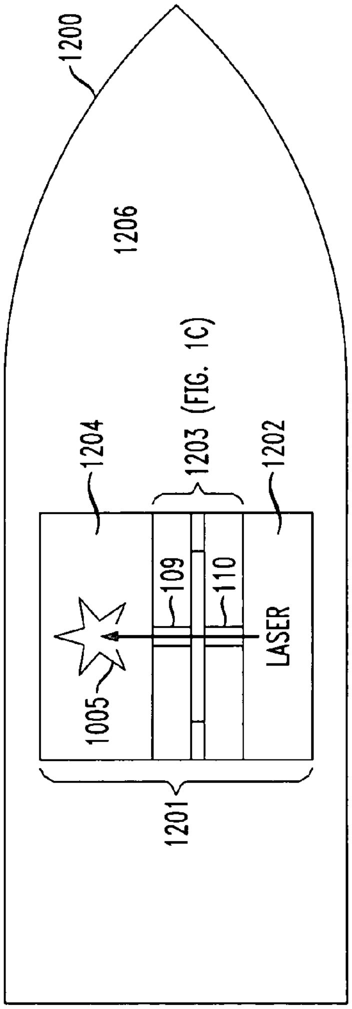

Shown in FIG. 12 is an illustrative fusing arrangement 1201 of a munition (ordnance) 1200 including a laser 1202, my MEMS arming device 1203, ignitor 1204 and explosive charge 1206 In FIG. 12A, my MEMS arming device 1203 is shown in its rest position (FIG. 1A—prior to being fired) in which the fuse windows 109 and 110 are not aligned and hence laser 1002 signal is blocked from igniting the ignitor charge 1204. In FIG. 12B, as will be discussed in detail in later paragraphs, after the munition 1200 is fired and the MEMS arming device 1203 is moved to its fully armed position (FIG. 1C), the fuse windows 109 and 110 are aligned enabling laser 1202 signal to ignite the ignitor charge 1204 and detonate 1005 explosive charge 1206. In one illustrative embodiment, my MEMS arming device 100 may be implemented as part of the fusing arrangement described in the concurrently filed patent application of D. Bishop et al case 56-3-2, entitled “FUSE FOR PROJECTED ORDNANCE,” Ser. No. 10/766,449, which is incorporated by reference herein.

The MEMS arming device 100 is formed by selectively etching the Silicon wafer 301, Oxide layer 302, and a Silicon layer 303. In FIGS. 1A–1C, the Silicon layer 303 is shown in grey and the etched-out region of the Silicon layer reveals the Silicon Oxide layer 302, shown in white. With reference to FIG. 1A, the MEMS arming device 100 is shown in its rest position (first switch state), prior to the munition being fired (FIG. 10A). The Shuttle A, 103, is formed in the Silicon layer and is supportably attached to housing 101 using four support springs, e.g., 102. Shuttle A, 103, also includes two latch springs, e.g., 104, for latching shuttle A’s position once it has moved a predetermined distance in direction 150. The latch springs 104 also restrict shuttle A’s movement within housing 101 in only direction 150.

Shuttle B, 105, is etched within the shuttle A, 103, and is supported by Shuttle A using four support springs, e.g., 106. Shuttle B also has two latch springs, e.g., 107 for latching shuttle B’s position once it has moved a predetermined distance in direction 152. Preferably, the direction 152 is perpendicular to the direction 151. Shuttle B has a vertical extension 108 that is etched in a vertical channel of shuttle A which enables shuttle B to move essentially only in the upward vertical direction 152. The shuttle B has etched therein a circular fuse window 109. The Silicon Wafer 301 also has a circular fuse window 110 etched therein, which is offset in both the vertical direction 153 and horizontal direction 151 relative to fuse window 109.

A spring-suspended absorbing stop 111 is also etched from the housing frame 101 to limit the movement of shuttle A in the direction 150. A thermal actuator 112 is etched from housing 101 and includes two horizontal arms 113 and a vertical push-rod 114 mounted perpendicular to the midpoint of the two arms. When an electrical current is applied to thermal actuator 112 and through arms 113, the arms are heated. This causes the arms to expand and deflect in an upward direction forcing push-rod 114 in the vertical direction 152, thereby generating an upward force (thermally activated force) applied to the vertical extension 108 of shuttle B. It should be noted that the thermal activator may, more generally, include one or more arms connected to push-rod 114.

The arms 113 are formed to have an upward bow to insure that they deflect upward in the direction 152 when heated. As shown, as a safety feature, push-rod 114 is not aligned with extension 108 when the MEMS arming device 100 is in the rest position, shown in FIG. 1A. This prevents the operation of thermal activator 112 from moving push-rod 114 in the direction 152 when in the rest position. This feature prevents MEMS arming device 100 from entering a fully armed state prior to the munition being fired. This provides a dual-interlock safety feature, which prevents thermal actuator 112, even if accidentally activated during the rest state, from fully arming MEMS device 100 unless shuttle A 103 has first been latched following the firing of the munition.

As shown in FIG. 1B, the MEMS arming device 100 is in the partially armed position after the munition has been fired. When the munition is fired, the inertia of shuttle A, 103, causes it to move in the horizontal direction 150 relative to the MEMS arming device 100 movement. The MEMS arming device 100 is designed to have a high acceleration threshold which prevents the MEMS arming device 100 from being activated by dropping or other shock forces. The threshold acceleration needed to latch shuttle A is determined essentially by the dimensions of the four support springs, e.g., 102. This feature ensures that MEMS arming device 100 is only to be activated by the substantial acceleration forces of 10,000 to 80,000 g generated when the munition is fired. The absorbing stop 109 is used to limit the horizontal movement of shuttle A. The result is that shuttle A is moved horizontally in direction 150 (relative to the MEMS housing 101) and latched into the firing position by the two latches 104. With shuttle A latched, the fuse window 110 in shuttle B has also been moved horizontally in direction 150 and is now positioned vertically below the fuse window 109 in the Silicon Wafer 301. In this partially armed position (intermediate switch state), the thermal actuator 112 is now aligned below and, when thermally activated, can engage the vertical extension 108 and cause shuttle B to move in the vertical direction 152 to the fully armed position.

Shown in FIG. 1C is the MEMS arming device 100 in the fully armed position (second switch state) after the munition has been fired and the on-demand thermal actuator 112 is pulsed in response to a pulsed activation signal. After the pulse the thermal actuator 112 returns to it original position, as shown, leaving shuttle B in its latched position. The thermal actuator 112 provides a thermal interlock safety feature, which insures that the MEMS arming device 100 does not enter the fully armed position (second switch state) without both the activation of both the acceleration interlock and thermal interlock safety features. The thermal actuator 112 is activated by the application of an electrical signal applied across the pads 112A. When thermally activated the arms 113 are heated, they expand and deflect upward forcing push-rod 114 in the vertical direction 152 to engage the vertical extension 108 and cause shuttle B to move vertically to the fully armed position. The two latch springs 107 latch keeping shuttle B in the fully armed position. In the fully armed position the fuse window 110 in shuttle B has been moved up vertically in direction 152 so that it is now positioned directly over the fuse window 109 in the Silicon Wafer 301.

With reference to FIG. 12B, in this fully armed position a laser 1202 signal can pass through the aligned fuse windows 110 and 109 and impinge the ignitor 1204 and cause detonation 1005 of explosive charge 1206.

Figure 2:
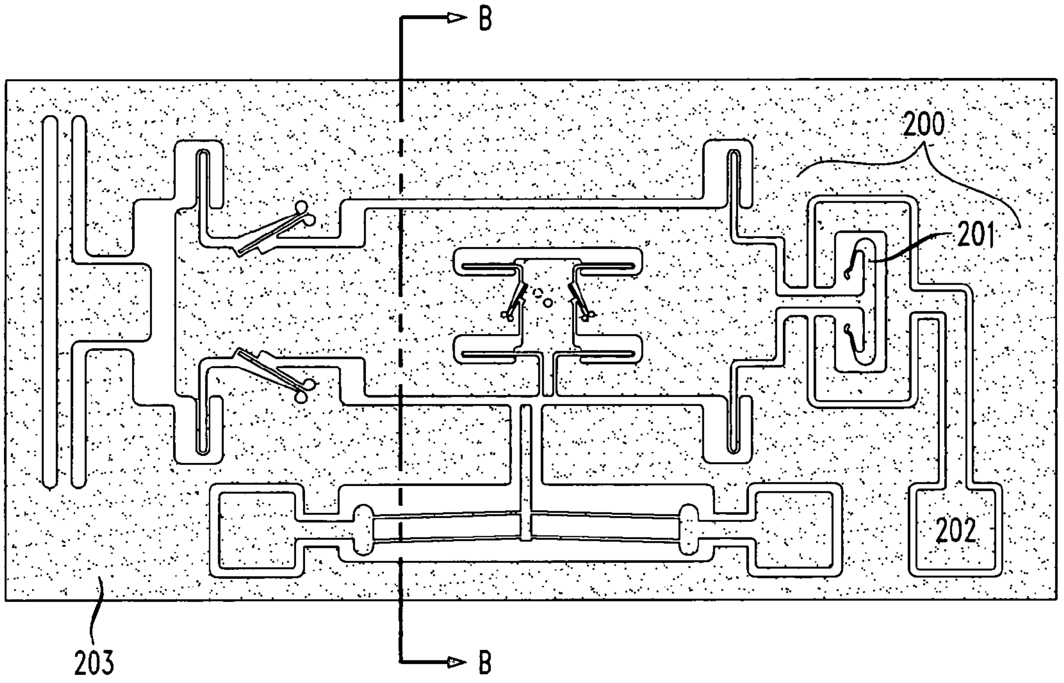
FIG. 2 illustrates my MEMS arming device further including an electrical interlock.

FIG. 2 illustrates my MEMS arming device 100 further including an electrical safety interlock 200. The electrical safety interlock 200 includes a switch 201 that is etched as part of shuttle A and, consequently, switch 201 is not closed until the munition is fired. After firing, a ground signal from lead 203 is coupled through springs 102, shuttle A, switch 201 to contact pad 202. This ground signal could provide a control signal to enable a control circuit (not shown) to provide an electrical signal to activate the thermal activator 112. For example this control signal may be used to activate the laser (or electrical device) that will, after the thermal actuator 112 is activated, detonate the munition.

Figure 7:
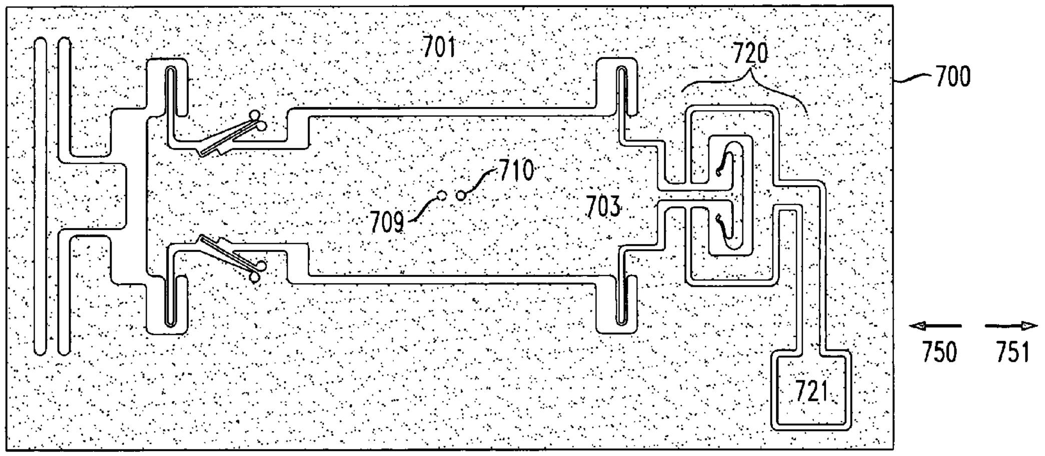
FIG. 7 shows a second embodiment of my MEMS device having only one shuttle.

Shown in FIG. 7 is a second embodiment of my MEMS device 700 having only one shuttle 703. Other than including only shuttle A, MEMS device 700 may be implemented to include all of the other elements and features of the MEMS devices shown in FIGS. 1 and 2. The MEMS device 700 is shown in its rest position and the circular window 710 of shuttle A 701 is shown horizontally displaced from the circular window 709, shown in dotted-line form, in the Silicon Wafer. The MEMS device is also shown to include electrical switch 720. When MEMS device 700 undergoes a predetermined acceleration in direction 751, shuttle 701 moves in the direction 750 relative to MEMS device 700. After acceleration, shuttle 703 has moved so that the circular window 710 aligns with circular window 709 and electrical switch 720 has been closed applying a control signal to pad 721. In accordance with the present invention, the design of MEMS device 700 can be adapted for use as an automobile accelerometer to detect inertial (deceleration) forces that occur during a car collision. In such an application, MEMS device 700 detects a predefined acceleration (i.e., deceleration of the car), which causes shuttle 703 to close electrical switch 720 thereby generating a control signal to initiate deployment of the air-bag.

Etching the MEMS Arming Device

Figure 3:
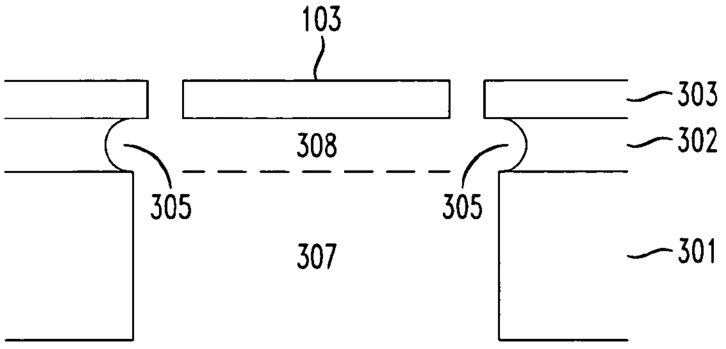
FIG. 3 is a B—B cross section view of the MEMS arming device showing the etching processes from the top and bottom sides.

The following discussion makes joint reference to FIGS. 1 and 3. As noted previously, in FIGS. 1A–1C and 2, the Silicon layer 303 is shown in grey and the etched-out region of the Silicon layer, which reveals the Silicon Oxide layer 302, is shown in white. Since the movable elements of MEMS arming device 100 including the shuttle A, 103, shuttle B, 107, absorbing stop 109, arms 113, push-rod 114, and switch 201 (of FIG. 2) must all be free to move relative to the housing 101 and Silicon wafer 301, the Oxide layer 302 needs to be etched away under all of these movable elements. Briefly, the MEMS device 100 is formed by (A) first patterning and etching the movable elements in the Silicon layer 303 (i.e., second layer) and stopping on the Silicon Oxide layer 302 (i.e., first dielectric layer or electrically insulating layer), (B) patterning and etching a predetermined pattern in the Silicon Wafer 301 (i.e., semiconductor wafer) from the bottom surface and stopping on the Silicon Oxide layer 302, (C) etching away the exposed regions of the Silicon oxide layer 302, and (D) continuing this etch to allow undercutting sufficient to free the moveable elements from the Silicon Wafer 301. This procedure for etching the moveable elements is more fully described in the following paragraph.

Figure 6:
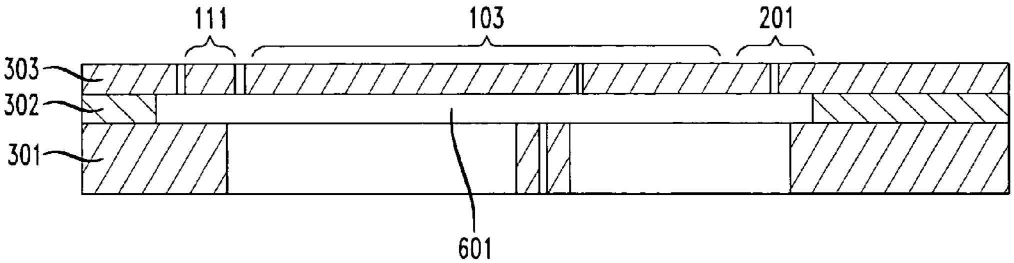
FIG. 6 is an A—A cross section view of the MEMS arming device showing that the Oxide layer is etched away below the moveable components of top Silicon layer.

With reference to FIG. 3, there is shown an illustrative B—B cross section of the shuttle A element of FIG. 2. First the Silicon layer 303 (shown in grey in FIG. 2) has been etched away using a reactive ion etch (RIE). Next the portion 307 of the Silicon wafer 301 is etched away using a deep reactive ion etch (DRIE). Next an oxide etching solution is applied which will etch region 308 of Oxide layer 302 not protected by the Silicon layers 303 or 301 and then etch the regions 305 of Oxide layer 302 located under the Silicon layers 303 and 301. This is shown illustratively in FIG. 6 where the region 601 of Oxide layer 302 below the moveable elements shuttle A, 103 (including switch 201) and absorbing stop 109 has been etched away enabling these elements to be suspended from housing 101 and free to move. The shuttle A, 103 is suspended from housing 101 by its four support springs 102 and absorbing stop 109 is also suspended from housing 101.

Figure 4:
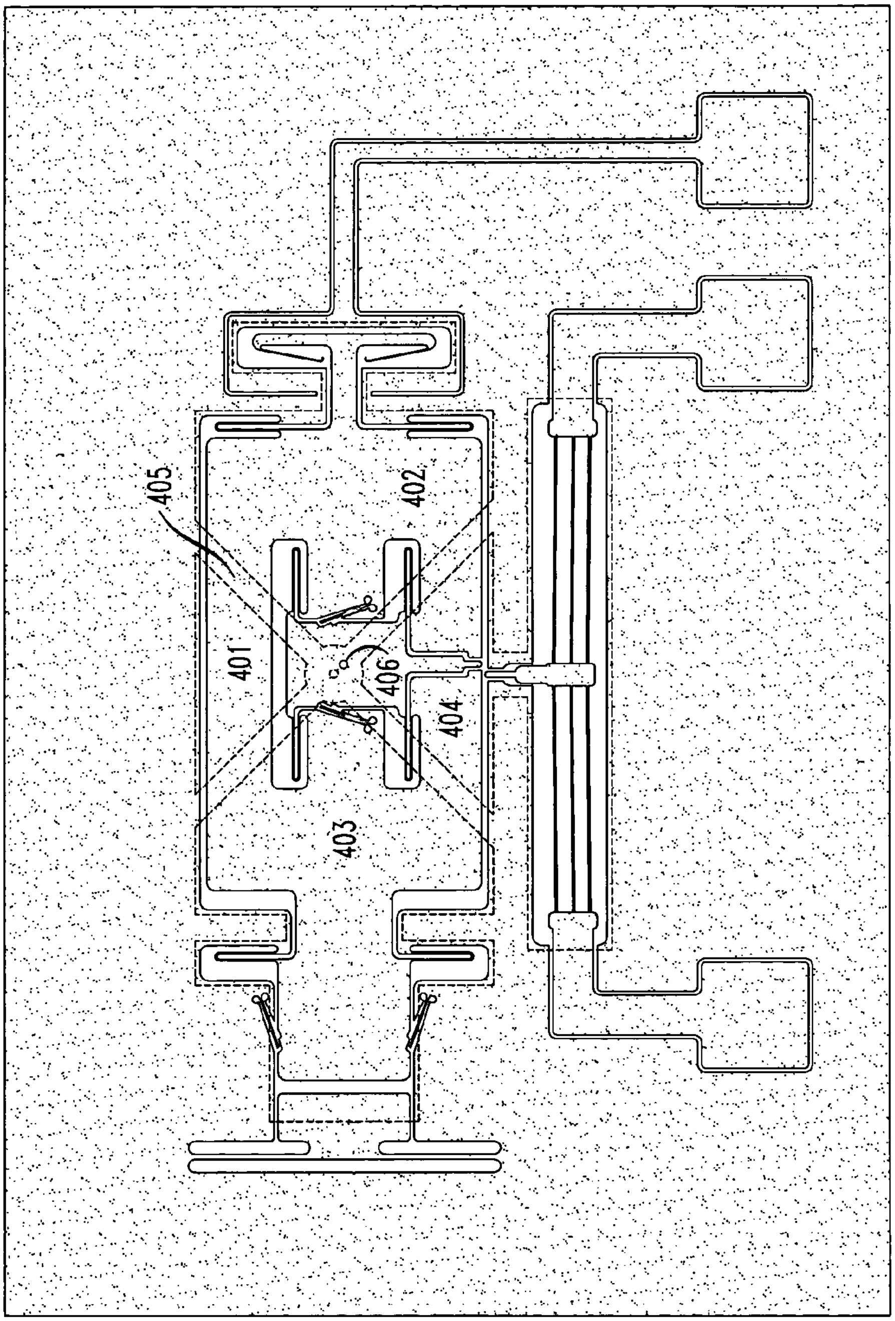
FIG. 4 is a top view of the MEMS arming device showing, in dotted-line form, the Silicon Wafer mask used to etch shuttle A from the bottom or wafer side.
Figure 5:
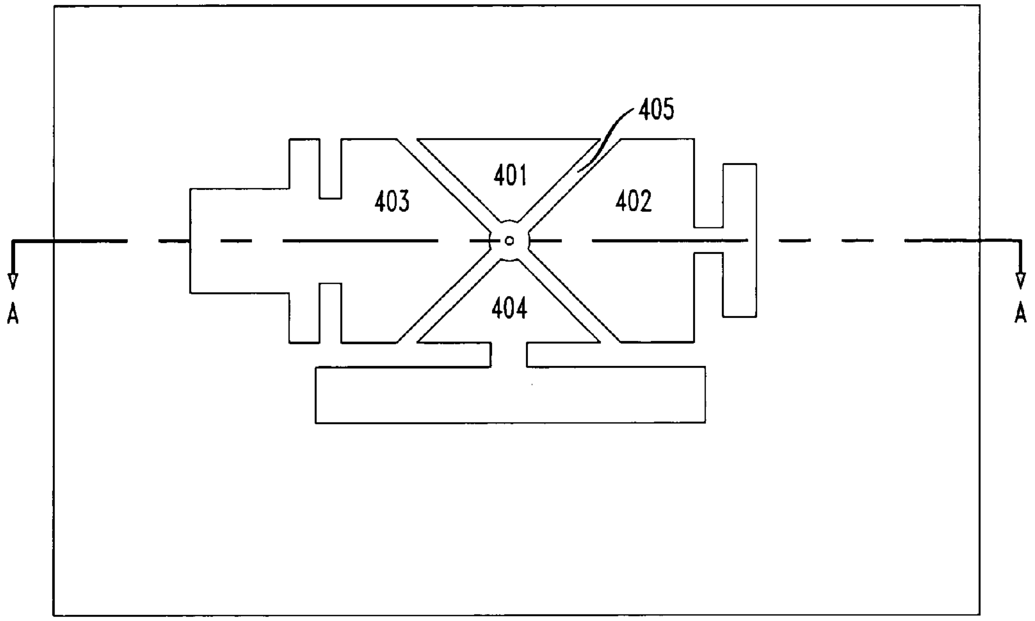
FIG. 5 more clearly illustrates the Silicon Wafer mask, shown in dotted-line form in FIG. 4, which is used to etch shuttle A from the wafer side.

FIG. 4 is a top view of the MEMS arming device 100 showing the various areas of Silicon wafer 301, in dotted lines, that are to be etched from the bottom or Silicon wafer 301 side. To insure that the entire Oxide layer 302 is removed below the moveable elements, the Silicon wafer 301 side is etched in the regions 401–404 exposing the bottom side of Oxide layer 302. As a result, the "X" shaped region 405 and other areas as well as the perimeter portion of the housing 101 of Silicon wafer 301 serve as a mask to define the bottom side regions of Oxide layer 302 to be etched. The fuse window 107 opening is also etched in Silicon Wafer 301. The resulting dotted line shaped mask of FIG. 4 is shown in FIG. 5. The bottom side of Oxide layer 302 that has been exposed by the silicon wafer mask of FIG. 5, i.e., regions 401–404, can then be etched away. This is shown illustratively in the cross section FIG. 6, where the Oxide region 601 below the moveable elements shuttle A, 103 (including switch 201) and absorbing stop 109 has been etched away. Thus, by etching the Oxide layer 302 from both the top side and the bottom side I am able to remove the entire Oxide layer 302 from beneath the moveable elements of MEMS arming device 100.

Element Details

Figure 8:
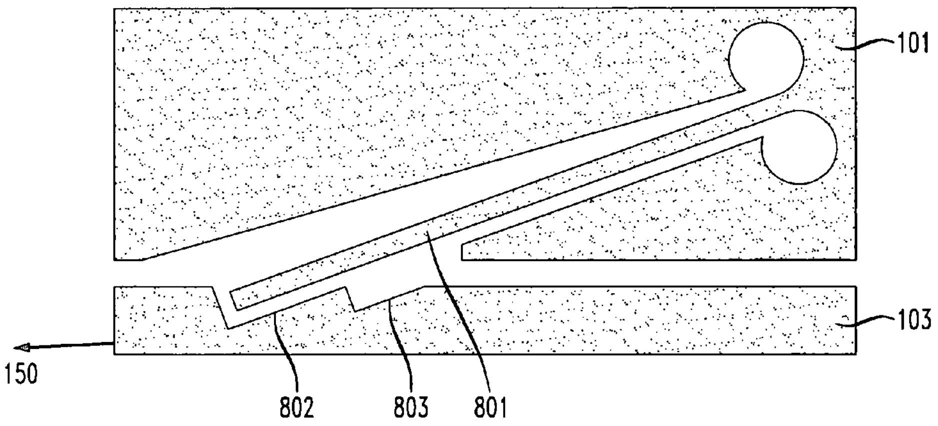
FIGS. 8–11 show details of the Latch Element, Absorbing Stop, Support Spring, and Shuttle B, respectively.

FIGS. 8–11 show details of the Latch Element, Absorbing Stop, Support Spring, and Shuttle B, respectively. Shown in FIG. 8 is an illustrative Latch element 104 formed in the housing portion 101 of MEMS arming device 100 and includes a cantilevered beam 701, the free end of which extends into a notch 702 formed in shuttle A, 103. As depicted shuttle A is in the rest position. When shuttle A moves in the direction 150 in response to the firing of the munition, the free end of cantilevered beam 701 ratchets over from notch 702 to and latches in notch 703. While the construction of the other Latch elements 107 of shuttle B are somewhat smaller than Latch element 104 they operate in the same manner when shuttle B is moved in direction 152. It should be noted that the arrangement of latch springs 104 and 107 can be reversed such that, e.g., the notches 702, 703 of latch spring 104 are located on the housing 101 and the beam 701 portion located on shuttle A.

Figure 9:
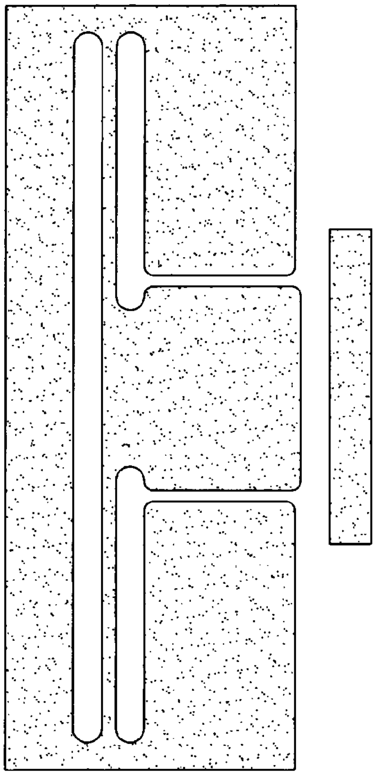
Figure 10:
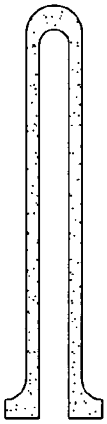
Figure 11:
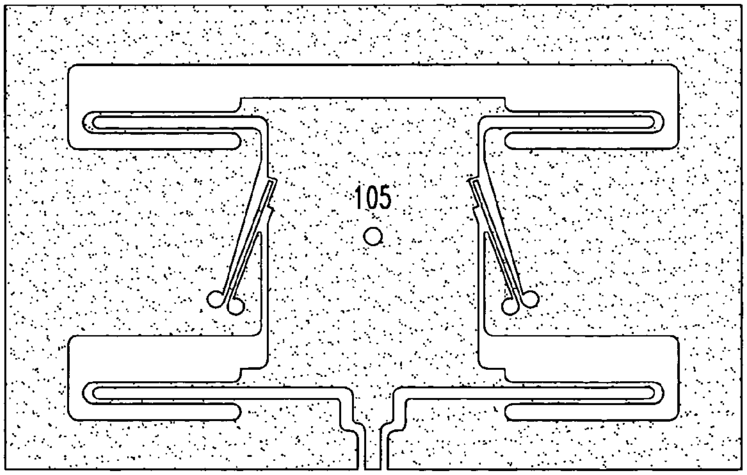

FIG. 8 illustratively shows the construction of Absorbing Stop 109. FIG. 9 shows the construction of support springs 102, the support springs 106 being comparable in size. FIG. 10 shows an enlargement of shuttle B, 105, illustrating the construction thereof.

Various modifications of this invention will occur to those skilled in the art. Nevertheless all deviations from the specific teachings of this specification that basically rely upon the principles and their equivalents through which the art has been advanced are properly considered within the scope of the invention as described and claimed.

I claim:

1. A micro-electrical-mechanical-switch, MEMS, monolithic semiconductor device comprising a semiconductor wafer, a first dielectric layer formed on the semiconductor wafer, and a second semiconductor layer formed on the first layer;

a first latching movable shuttle formed in the second layer and having the first layer removed under the first shuttle, the first shuttle being moved in a first direction relative to the wafer in response to a predetermined acceleration of the MEMS device in a direction opposite to the first direction so as to change an operating condition of the MEMS device from a first switch state to an intermediate switch state;

a second latching moveable shuttle formed within the first shuttle, the second shuttle being moved in a second direction relative to the first shuttle in response to a thermally activated force so as to change the operating state of the MEMS device from the intermediate switch state to a second switch state; and wherein in the second switch state an opening in the second shuttle aligns with an opening in the wafer to enable an optical signal to pass through the aligned openings.

2. The MEMS device of claim 1 further comprising means for preventing the movement of the second shuttle prior to the movement of the first shuttle.

3. The MEMS device of claim 1 further comprising an electrical switch for providing an electrical switch connection when the MEMS device is in the intermediate state.

4. The MEMS device of claim 1 further comprising an absorbing stop formed in the second layer for limiting the movement of the first shuttle in the first direction.

5. The MEMS device of claim 1 further comprising a thermal activator responsive to an electrical signal for generating the thermally activated force.

6. The MEMS device of claim 5 wherein the thermal activator includes one or more arms having a push-rod mounted perpendicular to the midpoint of the one or more arms and where in response to the passage of the electrical signal through the one or more arms, the one or more arms expand and deflect causing the push-rod to generate the thermally activated force.

7. The MEMS device of claim 1 wherein the second direction of movement is perpendicular to the first direction of movement.

8. The MEMS device of claim 1 wherein the semiconductor wafer is silicon, the first layer is silicon oxide and the second layer is silicon.

9. The MEMS device of claim 1 being formed by

A. first patterning and etching the movable elements in the second layer and stopping on the first dielectric layer, B. patterning and etching a predetermined pattern in the semiconductor wafer from the bottom surface and stopping on the first dielectric layer, C. etching away the exposed regions of the first dielectric layer, and D. continuing this etch to allow undercutting sufficient to free the moveable elements from the semiconductor wafer.

10. The MEMS device of claim 1, further comprising a movable rod formed in the second layer and adapted to move with respect to the first and second shuttles in response to said force such that the movable rod is adapted to push the second shuttle from a position corresponding to the intermediate switch state to a position corresponding to the second switch state.

11. The MEMS device of claim 1, further comprising an electrical switch for providing an electrical switch connection, wherein said electrical switch is adapted to change its state upon the MEMS device transition from the first state to the intermediate state.

12. The MEMS device of claim 1, wherein position of the second shuttle with respect to the first shuttle is unchanged upon transition from the first switch state to the intermediate switch state.

13. The MEMS device of claim 1, wherein:

in the first switch state, the opening in the second shuttle is displaced from the opening in the wafer along the first and second directions; and in the intermediate switch state, the opening in the second shuttle is displaced from the opening in the wafer along the second direction, but said openings are aligned with one another along the first direction.

14. The MEMS device of claim 1, further comprising two or more springs, each connected between the first and second shuttles.

15. A method of operating a MEMS monolithic semiconductor device comprising a semiconductor wafer, a first dielectric layer formed on the semiconductor wafer, and a second semiconductor layer formed on the first layer, the method comprising the steps of:

latching a first movable shuttle formed in the second layer and having the first layer removed under the first movable shuttle, the first movable shuttle being moved in a first direction relative to the wafer in response to a predetermined acceleration of the MEMS device in a direction opposite to the first direction; the latched first movable shuttle changing a operating state of the MEMS switch from a first state to an intermediate state and latching a second moveable shuttle formed within the first shuttle, the second shuttle being moved in a second direction relative to the first shuttle in response to a thermally activated force so as to change the operating state of the MEMS switch device from the intermediate state to a second state.

16. The method of claim 15, wherein the step of latching the second moveable shuttle comprises pushing the second shuttle relative to the first shuttle in the second direction from a position corresponding to the intermediate state to a position corresponding to the second state with a movable rod formed in the second layer and adapted to move with respect to the first and second shuttles in response to said force.

17. A micro-electrical-mechanical-switch, MEMS, monolithic semiconductor device comprising a semiconductor wafer, a first electrically insulating layer formed on the semiconductor wafer, and a second semiconductor layer formed on the first layer;

a latching movable shuttle switch formed in the second layer and having the first layer removed under the shuttle switch, the shuttle switch being moved in a first direction relative to the wafer in response to a predetermined acceleration of the MEMS device in a direction opposite to the first direction, thereby changing an operating state of the shuttle switch, wherein the shuttle switch includes a first circular window formed therein which is vertically aligned but horizontally displaced from a second circular window formed in the wafer, and wherein in response to the MEMS device undergoing the predetermined acceleration the shuttle switch is moved so that the first circular window is horizontally moved in the first direction to be aligned over the second circular window, to thereby enable an optical signal to pass through the first and second circular windows.

18. The MEMS device of claim 17 wherein the shuttle switch includes an electrical switch for providing an electrical switch connection when the MEMS device has undergone the predetermined acceleration.

19. The MEMS device of claim 17 further comprising an absorbing stop formed in the second layer for limiting the movement of the shuttle switch in the first direction.

20. The MEMS device of claim 17 wherein the semiconductor wafer is silicon, the first layer is silicon oxide and the second layer is silicon.

* * * * *